United States Patent
Kobayashi

(10) Patent No.: US 7,753,614 B2
(45) Date of Patent: Jul. 13, 2010

(54) CONNECTION DEVICE FOR TIRE-BUILDING DRUM

(75) Inventor: Hiroto Kobayashi, Kodaira (JP)

(73) Assignee: Bridgestone Corporation, Tokyo (JP)

(*) Notice: Subject to any disclaimer, the term of this patent is extended or adjusted under 35 U.S.C. 154(b) by 1119 days.

(21) Appl. No.: 10/558,886

(22) PCT Filed: Jun. 3, 2004

(86) PCT No.: PCT/JP2004/007711
§ 371 (c)(1),
(2), (4) Date: Feb. 16, 2006

(87) PCT Pub. No.: WO2004/108399
PCT Pub. Date: Dec. 16, 2004

(65) Prior Publication Data
US 2006/0140713 A1    Jun. 29, 2006

(30) Foreign Application Priority Data
Jun. 3, 2003    (JP)    ............... 2003-157657

(51) Int. Cl.
*F16B 7/18*    (2006.01)
(52) U.S. Cl. ............... 403/341; 403/338; 403/373
(58) Field of Classification Search ............... 403/335, 403/338, 341, 350, 373, 374.1
See application file for complete search history.

(56) References Cited

U.S. PATENT DOCUMENTS

| | | | | |
|---|---|---|---|---|
| 2,007,897 A | * | 7/1935 | Skeel | 403/335 |
| 2,365,327 A | * | 12/1944 | Barnes | 403/350 |
| 2,862,728 A | * | 12/1958 | Druschel et al. | 403/338 |
| 4,244,456 A | * | 1/1981 | Loker | 403/335 |
| 5,665,001 A | | 9/1997 | Jacob et al. | |

FOREIGN PATENT DOCUMENTS

| | | |
|---|---|---|
| DE | 38 36 764 A1 | 6/1989 |
| DE | 44 19 342 C1 | 7/1995 |
| DE | 197 46 394 A1 | 4/1999 |
| EP | 0 379 009 A2 | 7/1990 |
| GB | 1 202 238 | 8/1970 |
| GB | 2 226 869 A | 7/1990 |
| JP | A 59-126115 | 7/1984 |

(Continued)

*Primary Examiner*—Michael P Ferguson
(74) *Attorney, Agent, or Firm*—Oliff & Berridge, PLC

(57) ABSTRACT

A connection device for a tire-building drum significantly improves work efficiency for connection and disconnection of a tire-building drum, with requirements for safety, cost, durability, occupied space, etc. sufficiently satisfied. The device connects a center shaft of a tire-building drum to a drive shaft on the building machine body side, where counter lock portions fitting into each other are provided on shaft ends of both shafts that are brought into contact with each other. One end portion of a tubular member is screwed to a head portion of the drive shaft, and cam rollers rotatable about center axes oriented in the radial direction are provided on an inner peripheral surface of the other end portion. At one end portion of the drum center shaft, there is provided a flange that is pressed by the cam rollers to the drive shaft side when the tubular member is displaced by tightening. Cutout portions are provided in the flange, for preventing the tubular body from interfering the cam rollers before the tightening displacement takes place.

4 Claims, 5 Drawing Sheets

FOREIGN PATENT DOCUMENTS

| | | |
|---|---|---|
| JP | A 62-290522 | 12/1987 |
| JP | U 1-72321 | 5/1989 |
| JP | A 2001-232693 | 8/2001 |
| JP | A 2002-18974 | 1/2002 |
| JP | A 2002-18975 | 1/2002 |
| SU | 812 651 | 3/1981 |

* cited by examiner

CONNECTION DEVICE FOR TIRE-BUILDING DRUM

FIELD OF THE INVENTION

The present invention relates to a device for connecting a center shaft of a tire-building drum for building a pneumatic tire, with a drive shaft on a building machine body side, and in particular to a technology for improving the work efficiency of connection and disconnection of both shafts.

BACKGROUND ART

Various proposals have been made with respect to the connection structure between a center shaft 112 of a tire-building drum 111 and a drive shaft 114 on a building machine body side 113, as shown in FIG. 5, for example. However, from the viewpoint of safety, cost, durability, occupied space, etc., a widely adopted measure is still to use a structure wherein flanges provided on the shaft ends of those shafts are brought into abutment with each other and connected together with a plurality of through bolts.

While a conventional technology is satisfactory in terms of safety, cost, durability, occupied space, etc., in order to connect the drum center shaft to the drive shaft, it is necessary to perform a counter lock fitting of these shafts for centering, followed by insertion of a plurality of bolts into the respective flanges and tightening of nuts to each of them. Due to requirement for such operations, the connection workability of the tire-building drum deteriorates, and the same is true for the disconnection of the tire-building drum from the building machine body.

Accordingly, it is an object of the present invention to provide a connection device for a tire-building drum in which work efficiency of both connection and disconnection of the tire-building drum is significantly improved even after requirements for safety, cost, durability, occupied space, etc. are fully satisfied.

DISCLOSURE OF THE INVENTION

The connection device for a tire-building drum according to one aspect of the present invention is for connecting a center shaft of the tire-building drum to a drive shaft on a building machine body side in which a form-locking portion in the truncated cone shape fitting to each other is provided on shaft ends of both shafts to be brought into contact with each other, one end of a cylindrical member is disposed by screwing to a head portion of the drive shaft preferably with a trapezoid screw, and a plurality of cam rollers rotatable around the center axis oriented in the radial direction are attached with an interval in the circumferential direction on the inner circumferential surface of the other end of this cylindrical member. Also, a flange pressed by the cam rollers to the drive shaft side under displacement by tightening of the cylindrical member is provided at the end portion of the above drum center shaft, and cutout portions are provided on the flange, for preventing interference of the cylindrical member with the cam rollers before the tightening displacement, i.e., in the loosened state.

In this instance, in a state where the cylindrical member of the drive shaft is in the loosened state, the drum center shaft is advanced and displaced toward the drive shaft side while the flange of the drum center shaft is passed through the cam rollers with its cutout portions so that a predetermined form-locking is achieved between the drum center shaft and the drive shaft for alignment of both shafts. Subsequently, the cylindrical member on the drive shaft is tightened and displaced so that the cam rollers ride over the flange, and the flange and hence the drum center shaft are sufficiently urged toward the drive shaft side. As a result, by pressing the flange by the cam rollers with a sufficiently large force toward the drive shaft, both the shafts can be connected with each other, i.e., the tire-building drum can be connected to the building machine body. In this case, the force for urging the flange or the pressing force can be increased particularly when the drive shaft is screwed to the cylindrical member with trapezoidal screws.

In this way, since both the shafts can be firmly connected as desired by the translation motion of the drum center shaft and a single rotational motion of the cylindrical member over a predetermined angular range, the connection work efficiency of the tire-building drum can be significantly improved as compared with the conventional technique wherein a plurality of bolts are inserted into a flange and tightened by nuts.

Also, since disconnection of both the connected shafts can be performed easily by rotational relaxing displacement of the cylindrical member and retracting displacement of the drum center shaft as mentioned above, the disconnection work can be conducted with high efficiency.

Moreover, in the connection device explained above, since both the shafts can be connected positively by mechanically holding the flange of the drum center shaft between the cam rollers provided on the cylindrical member based on the rotational displacement of the cylindrical member with its one end screwed to the drive shaft, high safety can be realized with less equipment cost and a sufficiently small occupied space.

Also, by rotating the cam rollers of the cylindrical member with respect to the flange of the drum center shaft, abrasion of these elements can be suppressed and durability can be improved. And also, if the contact area between the both is increased by screwing the cylindrical member and the drive shaft with the trapezoidal screws, their abrasion resistance or durability can be also improved.

The abrasion resistance is further improved if a metal plate with high hardness such as tool steel is disposed at least at a contact portion of the flange to make a line contact with the circumferential surface of the cam roller.

In the connection device according to another aspect of the present invention, a contact flange and a form-locking portion fitting to each other in the truncated cone shape, for example, are provided particularly at each of the shaft ends of the drum center shaft and the drive shaft, and an inclined surface is provided at each of the contact flanges which gradually thins it outward in the radial direction from the flange disposed shaft side. And tapered sidewall grooves to be in contact with both the inclined surfaces of the contact flanges are provided on a hinged clamp made of a pair of arcuate members disposed over the both flanges around the both contact flanges in the state brought into mutual contact.

In this instance, the tire-building drum is advanced and displaced toward the building machine body side, the form-locking portion to the drum center shaft and the drive shaft is fitted and both the contact flanges are brought into contact so that the both shafts are aligned and their positions in the axial direction are determined. In this state, the hinged clamp is fitted around both the contact flanges and the clamp is tightened so that the both shafts can be easily and quickly connected with sufficient firmness under a simpler structure.

Disconnection of both the shafts can be also performed easily and quickly by removal of the hinged clamp and retracting and displacement of the tire-building drum.

The tightening of the hinged clamp here may also be performed using a toggle clamp or the like, other than bolts and nuts.

Moreover, in the device having the respective contact flanges and the hinged clamp as the major constituting members, both the cost and occupied space can be sufficiently kept low and sufficiently high safety and durability can be ensured.

In this instance, by designing the inclined surface of each of the contact flanges and the tapered sidewall of each of the hinged clamps so as to be inclined in the same direction by an equal angle, when a surface contact between the inclined surfaces and the tapered sidewalls is made possible, the tightening force of the hinged clamps can be sufficiently distributed and a large tightening force can be prevailed uniformly over the entire inclined surfaces of each of the contact flanges, which also improves the abrasion durability.

If a surface contact between the drum center shaft and the drive shaft is made possible in each of the form-locking portion and the contact portion around this form-locking portion in either of aspect of the connection device and the above connection device, a load in the direction crossing the shafts in the connection state of both the shafts can be sufficiently distributed and supported, and a fear of local abrasion, damage, etc. that may be caused by a load concentration above a specific point can be advantageously eliminated.

Also, when a relative-rotation restricting means such as a detent key, detent pin, etc., for example, for the shafts is provided at the contact portion between the drum center shaft and the drive shaft, the torque of the drive shaft can be properly transmitted by the drum center shaft.

BEST MODE FOR CARRYING-OUT OF THE INVENTION

The present invention will be explained below with reference to preferred embodiments shown in the accompanying drawings.

Figure 1:
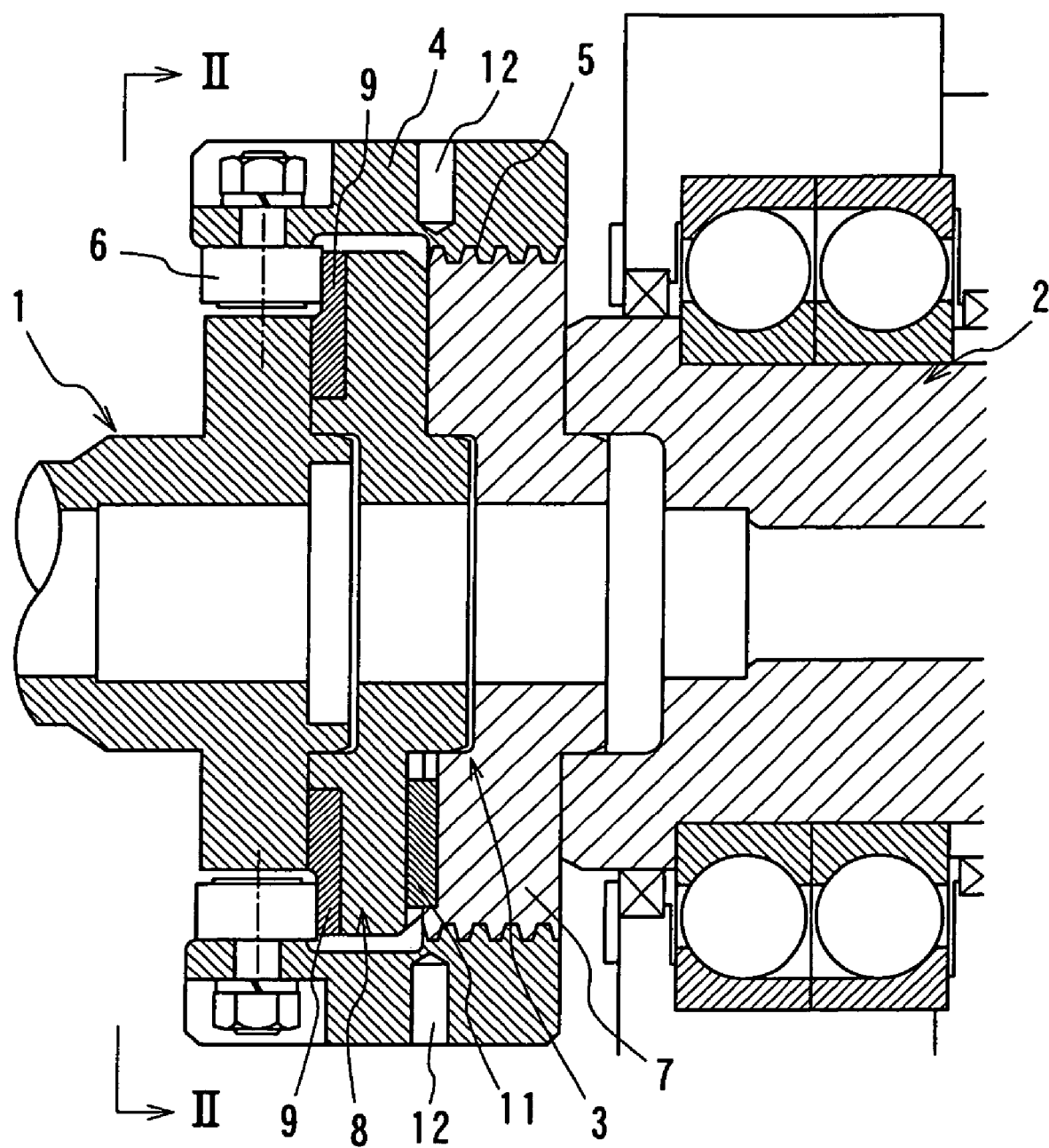
FIG. 1 is a longitudinal sectional view showing a preferred embodiment of the device according to the present invention.

FIG. 1 is a longitudinal sectional view showing one preferred embodiment of the present invention, which is in the connection state of both the shafts. Reference numeral 1 denotes a center shaft of the a tire-building drum, and 2 a drive shaft on a building machine body side.

Here, at the respective shaft ends of the drum center shaft 1 and the drive shaft 2 to be brought into contact with each other, there is provided a counter lock portion 3 comprising a projection and a recess fitting portion to be fitted to each other. Into the head portion of the drive shaft 2 having a slightly enlarged diameter, one end of a hollow cylindrical member 4 comprising an internally threaded inner surface preferably threaded with a trapezoidal thread 5.

The form-locking portion at both shaft ends may be comprised of a fitting portion of a truncated cone shape, instead of the counter lock portion 3.

Figure 2:
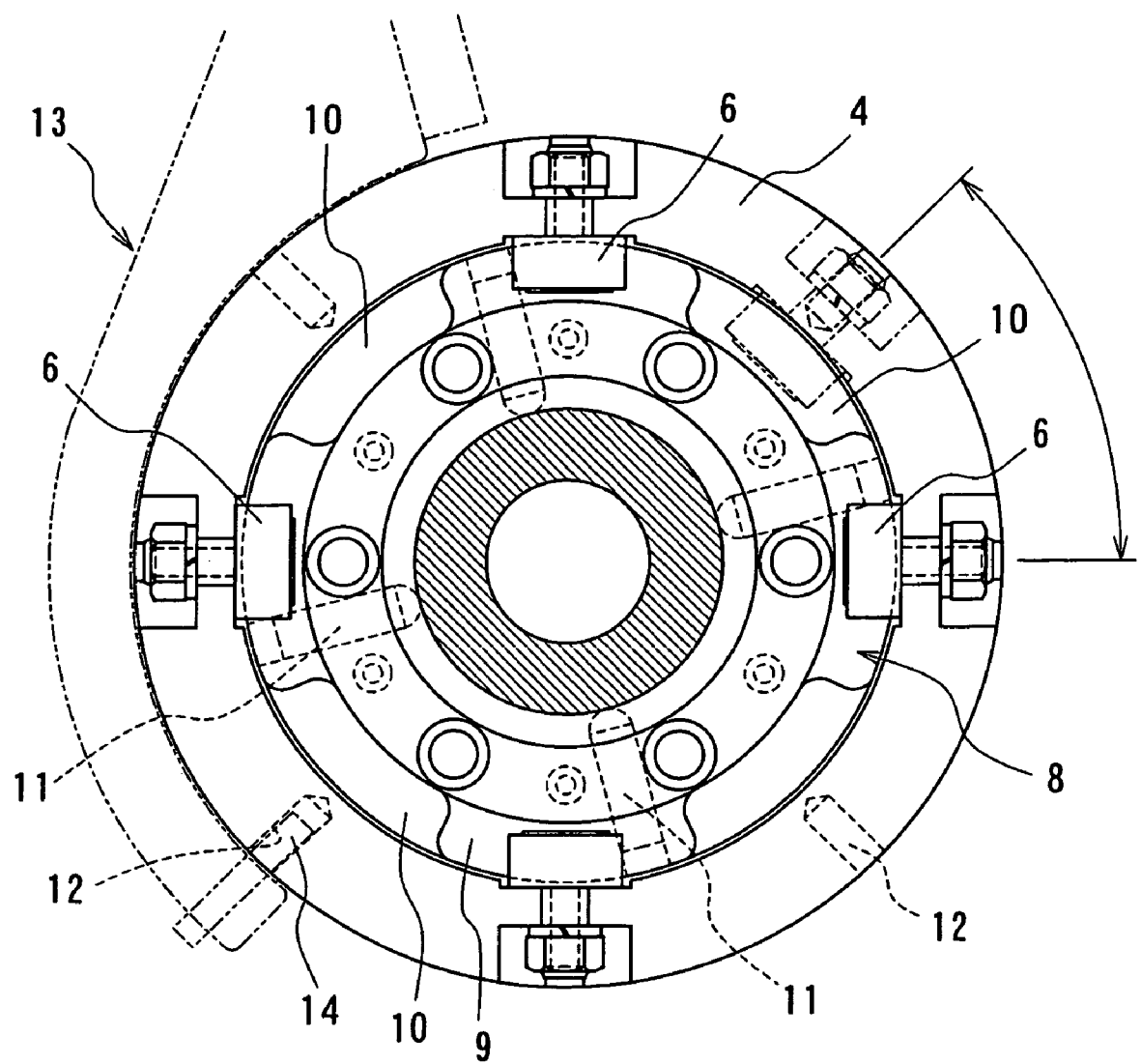
FIG. 2 is a cross-sectional view taken along the line II-II in FIG. 1.

Also, on the inner circumferential surface at the other end of the cylindrical member 4, as can be appreciated from FIG. 2 which is a cross-sectional view taken along the line II-II in FIG. 1, a plurality of cam rollers 6 rotatable around respective rotation members defining center axes oriented in the radial direction are mounted with an equal angular interval of 90 degrees, for example, in the circumferential direction.

On the other hand, at the head portion of the drum center shaft 1, there is provided a flange 8 to be brought into contact and for making a surface contact with a large diameter portion 7 of the drive shaft 2 comprising an externally threaded peripheral surface. This flange 8 has a thickness required to be pressed firmly by the cam rollers 6 toward the drive shaft 1 based on the tightening displacement of the cylindrical member 4, which will be explained hereinafter, and has an abrasion-resistant high-hardness metal plate 9 such as a metal plate made of tool steel including high-speed steel, tool steel alloy, etc., for example, preferably at the contact portion between it and the cam rollers 6.

This flange 8 has cutout portions 10 in the number corresponding to that of the rollers, for preventing interference with the cam rollers 6 of the cylindrical member 4 in the loosened state before tightening displacement, when the cam rollers 6 are situated at positions indicated by imaginary lines in FIG. 2, Entry of the flange 8 into the drive shaft 2 side from the cam rollers 6 is enabled by the action of these cutout portions 10.

As also shown in FIG. 2, at a portion on the flange 8 side of the large diameter portion 7 in the drive shaft 2, at least one (4 pieces in FIG. 2) of detent keys 11 extending in the radial direction are mounted, and grooves to be fitted with the respective keys 11 are provided on the flange 8.

Reference numeral 12 in FIG. 2 denotes a plurality of spanner engagement holes formed with an interval in the circumferential direction on the outer circumferential surface of the cylindrical member 4 and oriented in the radial direction, and the spanner engagement hole 12 functions to facilitate rotational displacement of the cylindrical member 4 by fitting an engagement projection 14 of a spanner 13 into it as shown by an imaginary line in FIG. 2.

When connecting the drum center shaft 1 to the drive shaft 2 as in the figure with the connection device constituted as above, the cylindrical member 4 is rotationally displaced into its loosened state, and in the state where the cam rollers 6 are positioned at their inactive positions as shown by imaginary lines in FIG. 2 with respect only to one of them by way of example, the drum center shaft 1 is advanced and displaced in order to allow the flange 8 to pass the cam roller positions. At the same time, fitting of the counter lock portion 3 and the fitting between the detent key 11 and the groove are achieved. Subsequently, by rotationally displacing the cylindrical member 4 by 45 degrees, for example, in the tightening direction with the spanner 13 or the like, each of the cam rollers 6 is made to ride over the flange 8 as shown by the solid lines in FIG. 2 and a large pressing force toward the drive shaft 2 side is applied onto the flange 8 so that a required connection is established between both the shafts 1 and 2 as shown in the figure.

In such a connected state between both the shafts 1 and 2, a load working on the tire-building drum in the direction crossing their center axes is sufficiently supported by the counter lock fitting portion and the contact surface between the large diameter portion 7 and the flange 8. Thus, the rotational torque of the drive shaft 2 is positively transmitted to the tire-building drum all the time under the engagement between the detent key 11 and the groove.

Disconnection of both the shafts 1 and 2, which had been connected in this way, can be performed easily and quickly by retracting and displacing the drum center shaft 1, with the cylindrical member 4 and the cam rollers 6 rotationally displaced into their loosened state.

In this way, with the connection device as described above, both connection and disconnection of the drum center shaft 1 and the drive shaft 2 can be performed with high work efficiency.

Figure 3:
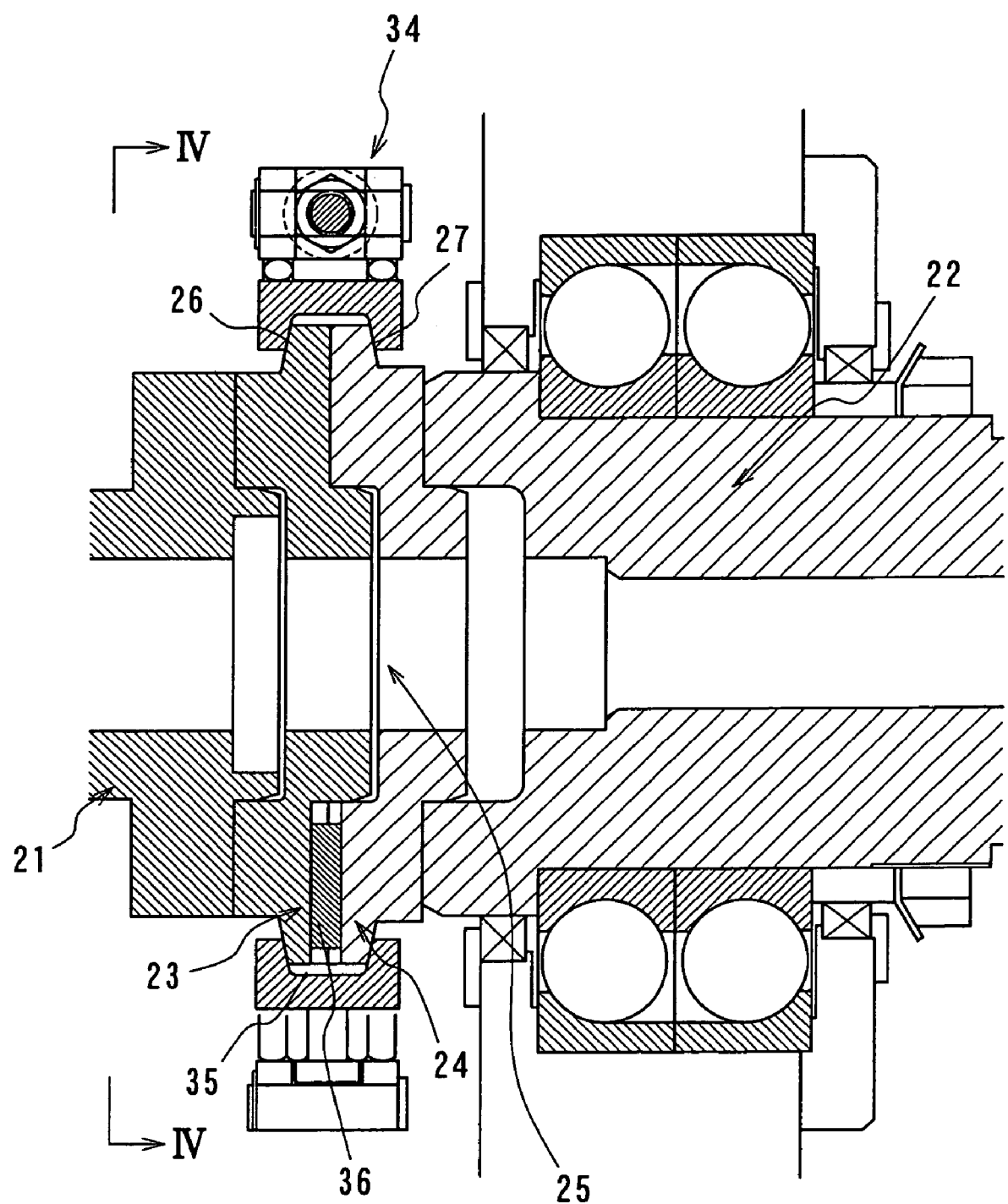
FIG. 3 is a longitudinal-sectional view similar to FIG. 1, showing another preferred embodiment of the device according to the present invention.

FIG. 3 is a longitudinal-sectional view, similar to FIG. 1, showing another preferred embodiment of the connection device.

Here, at each of the shaft ends of a center shaft 21 of the tire-building drum and a drive shaft 22 on the building machine body side, contact flanges 23 and 24 to be brought into contact with each other and a counter lock portion 25 as a form-locking portion to be fitted with each other are provided, and inclined surfaces 26 and 27 are provided at each of the contact flanges 23 and 24 which gradually thin them outward in the radial direction from the flange disposed shaft side.

Figure 4:
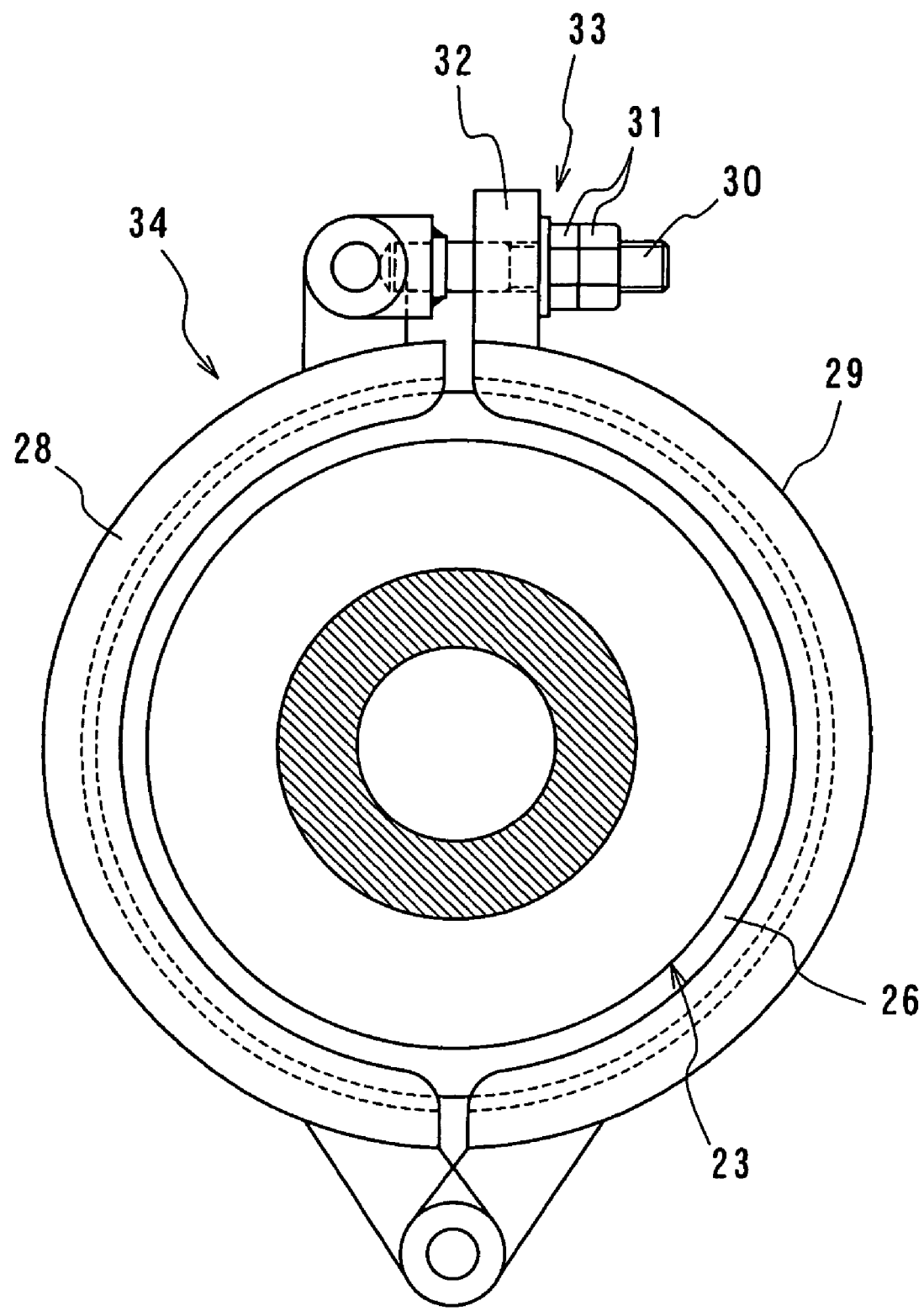
FIG. 4 is a cross-sectional view taken along the line IV-IV in FIG. 3.
Figure 5:
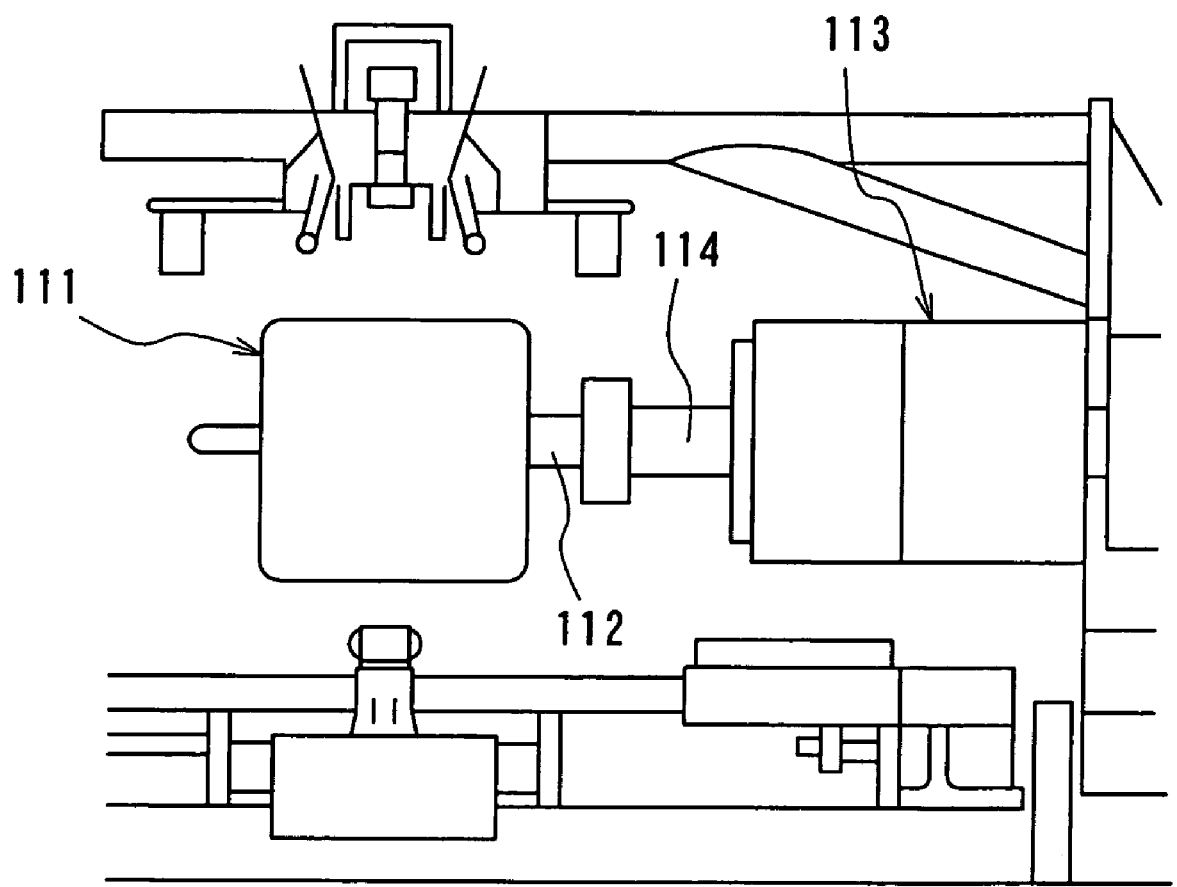
FIG. 5 is a schematic front view showing a connection mode between the center shaft of a tire-building drum and the drive shaft on a building machine body side.

Also, as can be appreciated from FIG. 4 showing the cross-section taken along the line IV-IV in FIG. 3, one end of each of a pair of arcuate members 28 and 29 in the form of substantially semicircular members is hinge-connected. A hinged clamp 34 comprising a tightening means 33 constituted, for example, by a bolt 30 mounted on one arcuate member 28 capable of oscillation, a nut 31 screwed therein and a clevis member 32 provided on the other arcuate member 29 provided on the other ends of them, is disposed around both the contact flanges 23 and 24 in the mutually contact state over those both contact flanges 23 and 24. A groove formed on the hinged clamp 34 and fitted to both the contact flanges 23 and 24 is made as a groove 35 preferably having a tapered sidewall to make surface contact to be brought into contact with each of inclined surfaces 26 and 27 of the respective contact flanges 23 and 24.

Here also, the counter lock portion 25 and each of the contact portions of the contact flanges 23 and 24 around it are preferably caused to make a surface contact. Alternatively, in the contact portions of both the shafts 21 and 22, a relative-rotation restricting means is preferably provided for those shafts comprised preferably of a plurality of detent keys 36 mounted on the contact surface side of the flange 24 and extending in the radial direction and a groove formed on the contact surface of the other contact flange 23 and being fitted with each of the keys 36, for example.

Mutual connection between both the shafts 21 and 22 with such a device can be made easily and rapidly by advancing the center shaft 21 of the tire-building drum so as to realize counter lock fitting of those shafts 21 and 22 and fitting between the respective detect keys 36 and the groove, and by subsequently disposing the hinged clamp 34 in the open state around both the flanges 23 and 24 and then, by sufficiently tightening the tightening means 33 of the clamp 34 so as to firmly fix both the flanges 23 and 24 under cooperation of the flange inclined surfaces 26 and 27 and the tapered sidewall of the groove 35 of the clamp 34.

Loads, torques, etc. in the respective directions under the above connection state are sufficiently supported and properly transmitted, as with the previous embodiment.

Disconnection of both the shafts 21 and 22 can be also performed efficiently by the operation in the order opposite to those explained above.

Although not shown in the drawings, in this connection device, by disposing a jig for attachment/removal of the hinged clamp 34, connection and disconnection of the tire-building drum can be easily automated.

In the above mentioned, the relative-rotation restricting means for both the shafts is comprised by a detent key and a groove fitted in it, but the restricting means can be also constituted by a pin stuck along the contact portion of both the shafts or in the direction crossing the contact surface and a groove or a hole allowing striking thereof.

Furthermore, depending upon the formation mode of the counter lock fitting or the like, the restricting means may be replaced by spline fitting, serration fitting or the like at that portion.

INDUSTRIAL APPLICABILITY

It will be appreciated from the foregoing description that, with the connection device according to the present invention, connection and disconnection works of the center shaft of the tire-building drum and the drive shaft on the building machine body side can be both performed with far higher efficiency than the conventional techniques.

Moreover, according to the present invention, safety and durability can be sufficiently improved, while costs, occupied space, etc. can be sufficiently kept low.

The invention claimed is:

1. A connection assembly for connecting a center shaft of a tire building drum to a drive shaft of a building machine body side, the assembly comprising:
   a drive shaft comprising a drive shaft end portion nonrotatably connected to a head flange having an externally threaded peripheral surface;
   a center shaft comprising a center shaft end portion nonrotatably connected to a center shaft flange having a radially extending clamping face facing away from the head shaft and having a plurality of cutouts circumferentially spaced around and axially extending through a peripheral edge of the center shaft flange;
   a hollow cylindrical member having an inner surface internally threaded at one end and a plurality of circumferentially spaced cam rollers disposed at the other end of the cylindrical member, each of the plurality of cam rollers being rotatable about a respective rotation member extending radially inward from the inner surface and defining a respective center axis of the cam roller;
   wherein the internal thread of the cylindrical member is threaded onto the external thread of the center shaft flange such that the cylindrical member is rotatably tightened about a rotation axis of the cylindrical member between a locked position and an unlocked position; and
   a plurality of form locking members comprising a plurality of radially extending detent keys circumferentially disposed on a radially extending end face of one of the center shaft flange and the head flange and a plurality of mating radially extending grooves circumferentially disposed on a radially extending end face of the other of the center shaft flange and the head flange;
   wherein in the unlocked position, the end faces of the center shaft flange and the head flange are brought into axially aligned contact such that the detent keys nonrotatably engage the mating grooves and the center shaft flange is axially received within the cylindrical member such that each cam roller is circumferentially aligned with and axially passes through a respective cutout; and
   wherein in the locked position, the cylindrical member is rotatably tightened about the rotation axis such that the cam rollers are circumferentially aligned with and apply a clamping force to the clamping face of the center shaft flange to clamp the head flange to the center shaft flange such that torque is transmitted from the drive shaft to the center shaft.

2. The connection assembly according to claim 1,wherein the head flange and the cylindrical member comprise trapezoidal threads.

3. The connection assembly according to claim 1, wherein an abrasion-resistant metal plate is disposed at least at a portion of said head flange in contact with the cam rollers.

4. The connection assembly according to claim 1, wherein in an abrasion-resistant metal plate is disposed at least at a portion of said head flange in contact with the cam rollers.

* * * * *